L. T. PEARSALL.
CUT-OFF VALVE.
APPLICATION FILED MAR. 29, 1917.
1,291,631.
Patented Jan. 14, 1919.
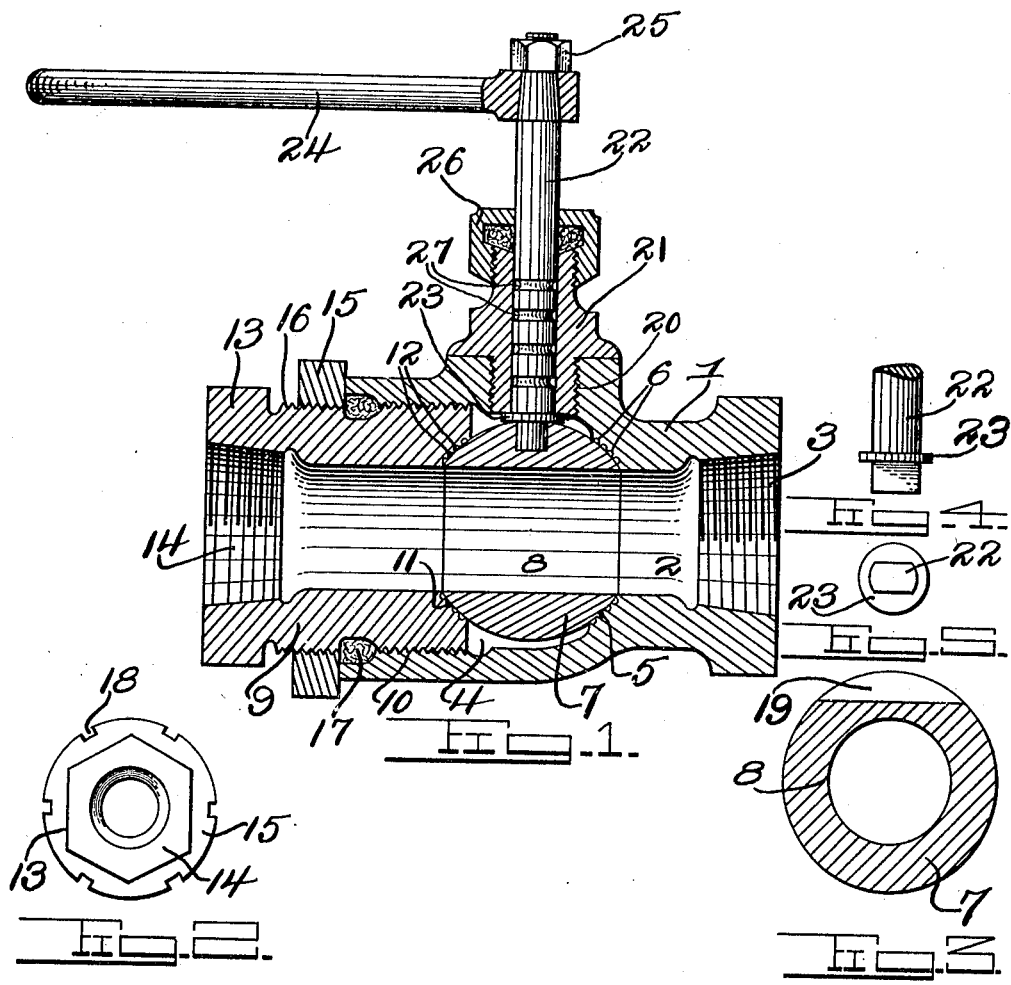
WITNESSES
John P. Woodworth
Lloyd W. Patch
INVENTOR
Luther T. Pearsall.
BY Richard Owen.
ATTORNEY

UNITED STATES PATENT OFFICE.

LUTHER T. PEARSALL, OF PITTSBURGH, PENNSYLVANIA.

CUT-OFF VALVE.

1,291,631.　　　　Specification of Letters Patent.　　Patented Jan. 14, 1919.

Application filed March 29, 1917. Serial No. 158,313.

*To all whom it may concern:*

Be it known that I, LUTHER T. PEARSALL, a citizen of the United States, residing at Pittsburgh, in the county of Allegheny and State of Pennsylvania, have invented certain new and useful Improvements in Cut-Off Valves, of which the following is a specification.

This invention relates to an improvement in cut off valves, and it is an object to provide a valve of the turning plug type which is adaptable for use in steam lines, or in other fluid supply pipes, where a quick acting and positive valve is required, the parts of the valve structure being so formed and mounted that adjustment can be made in the parts to fit the particular operating condition.

A further object resides in constructing the turning member to be of subtantially spherical form with an opening therethrough corresponding in size with the opening in the pipe thus giving a full flow through the valve, and in providing a mounting and a turning stem for the turning member which are so arranged that the turning plug or ball is given a full floating mounting, thus eliminating twisting strain or binding action, but which is at all times under the immediate and direct control of the operator.

Yet another object lies in providing a novel construction for the turning stem by which a fluid packing is accomplished and which will thus permit repacking of the stem when the valve is under pressure.

With the above and other objects in view which will be in part described and in part understood from the specification, drawings, and claims, my invention consists of certain novel features of construction and formation of parts which will be hereinafter set forth.

In the drawings:—

Figure 1 is a longitudinally sectional view through a valve constructed after the manner of my invention;

Fig. 2 is an elevational view of the left hand end of the casing as shown in Fig. 1;

Fig. 3 is a cross sectional view taken through the ball valve member;

Fig. 4 is a detail view showing the lower end of the valve stem;

Fig. 5 is a view in end elevation of the stem.

The casing 1 has a passage 2 provided at one end thereof which is screw threaded as shown at 3, preferably with a pipe cap, and then the body portion at the remaining end of the casing is widened out or flared and has the bore considerably enlarged to form a valve casing 4. The valve casing 4 is provided with a valve seating face 5 around the opening of the passage 2 thereinto, and packing grooves 6 are formed in this valve seating face concentrically around the passage 2.

The valve member or turning plug 7 is of substantially spherical or ball form and has an opening 8 formed therethrough to be of substantially the same size as the passage 2 thus providing a full straight-way port opening when the ball valve has been set to the position shown in Fig. 1. The inner wall of the flared portion of the casing 1 is screw threaded and a valve seating ring 9 is externally screw threaded as shown at 10 to be fitted and held within the casing 1, this ring 9 being provided with a valve seat 11 corresponding substantially in formation to the shape of the seat portion 5. By provision of the seats 5 and 11, the ball valve 8 can be placed in the casing and then the ring 9 can be threaded thereinto to bring the seat portion 11 against the ball valve 8 and in consequence the valve will be held in a proper position and will be given a full floating mounting thus positively precluding the possibility of binding due to improper alinement of the seat portions. The ring 9 has the packing groove 12 formed in the seat 11 thereof and in consequence a fluid packing will be accomplished around the ball valve 8 at this point.

It is to be understood that by mounting the ring 9 in the manner set forth the bearing of the ball valve 8 within the seats 5 and 11 can be tightened or loosened to suit various conditions of operation and for fluids of different density, and to facilitate turning of the ring 9, it is preferable that the outer end be shaped into a hexagonal nut formed as shown at 13, the bore of the ring being preferably screw threaded with a pipe cap as shown at 14. With the parts arranged in this way the ring 9 can be inserted and removed at will and can be adjusted to give the desired bearing against the ball valve 8, and to insure against accidental twisting of the ring 9, I provide a lock nut 15 adapted to be turned on the screw threads 16 of the ring 9 and to lock against the end of the casing 1. It is perhaps preferable that the bore of the casing be cored out to give a gland 17 for the reception of a packing material, and thus as the lock nut 15 is tightened down it accomplishes the dual purpose of packing the ring against leakage of the fluid from the valve casing and also secures the ring 9 in the desired adjusted position. As the lock nut 15 will in some instances be of rather large diameter it is perhaps preferable that the spanner slot 18 be provided therein due to the fact that some difficulty might be experienced in fitting a wrench, and it will also be understood that in place of the hexagonal nut form the outer end of the ring 9 might be shaped to have spanner slots.

The ball valve 8 is cut or slotted across its top to provide the groove 19, and the casing 1 has a screw threaded opening 20 formed through the upper side thereof with its center located at substantially the center of the ball valve this opening thus being located substantially adjacent the groove 19, a stem bearing 21 is provided with a screw threaded extension to be seated in the opening 20 and the bore of this bearing 21 is in line with the groove 19. A valve turning stem 22 is made of a size to have a turning fit within the bore of the bearing 21 and a flange 23 is provided on the stem to hold the stem against withdrawal from the bore of the bearing. Beyond the flange 23, the sides of the stem are flattened as shown in Fig. 5, and thus an extension is provided which will fit within the groove 19 of the ball valve 8 and will hold against turning and revolving movement in said groove. It is of course understood that the valve turning stem 22 extends beyond the bearing member 21 and a handle 24 is adapted to be fitted thereon and held in place by the nut 25, so that the stem 22 can be freely turned. A cap nut 26 is fitted to the stem 22 and is adapted to be tightened down on the upper end of the bearing portion 21 so that a loose packing can be forced in around the stem to prevent leakage from the casing, however, to further decrease the possibility of leakage, the stem 22 has fluid packing grooves 27 provided therearound in that portion which is received in the bore of the bearing portion 21.

From the foregoing it will be seen that I have provided a valve structure in which a ball valve having a full straight-way bored opening is given a full floating mounting and a stem by which turning of the ball valve is accomplished is fitted to prevent binding or lateral twisting within the casing, that the provision of the fluid packing grooves will make a valve which is substantially fluid tight when the ball is turned to the closing position, that adjustment of the parts can be made to properly tighten the seat of the ball valve to compensate for wear or to better adapt the structure for particular conditions for use, and that the structure as an entirety is one which can be installed and used in practically any connection where the usual form of turning plug or gate valve is adaptable for use, while at the same time the working parts are readily accessible and can be readjusted or repacked with facility.

While I have herein shown and described only a certain specific form of the various parts, it will of course be understood that a number of changes and variations might be made in the construction, form, arrangement and manner of mounting the elements, and therefore I do not wish to be limited to the exact disclosure but only to such points as may be set forth in the claims.

I claim:—

1. A cut-off valve including a casing having a fluid passage at one end and said casing flared at the remaining end, the casing being provided with a portion of a valve seat formed around the opening of the passage into the flared portion, a ball valve having a port therethrough arranged to be mounted in the flared portion of the casing and against the seat portion thereof, a ring provided at its end with the remaining portion of a valve seat adapted to be adjustably fitted in the flared end of the casing, a lock nut carried by said ring to be set against the end of the casing to secure the ring in its adjusted position, said ball valve being provided with a groove formed transversely thereon at one side and the casing having an opening formed adjacent the grooved side of the valve, a stem bearing mounted in the opening of the casing, a valve turning stem shaped at one end to be received and held in the groove of the ball valve fitted through the bore of the stem bearing and thus connected with the valve in such a manner that as the stem is turned the ball valve will be correspondingly moved, and fluid packing grooves provided around the stem and in the seats of the casing and the ring.

2. A cut-off valve comprising a casing, a rotary valve positioned therein and provided with a fluid passage way formed therethrough, said casing provided with an enlarged substantially circular pocket arranged therein for receiving said rotary valve, said substantially circular pocket provided with a series of water seal grooves formed therein, an adjustable valve seating member threaded into said casing and provided with a concave portion upon the inner end thereof having water seal grooves formed therein for engaging said rotary valve, and said seating member at all times projecting from one end of said casing for facilitating the adjustment thereof within said casing from the exterior thereof.

3. A cut-off valve comprising a casing, a rotary valve positioned therein and provided with a fluid passage way formed therein, said casing provided with a pocket for receiving said rotary valve, an adjusting seating member inserted within said casing and provided with a substantially concave end for firmly engaging one side of said rotary valve, said seating member provided with a gland receiving channel extending around the circumference thereof, said casing also provided with a gland receiving channel adapted to register with the gland receiving channel of said seating member for constituting the seal therefor, one end of said seating member at all times projecting beyond said casing for facilitating the adjustment thereof, and a binding nut threaded upon said seating member and adapted to engage said casing for firmly locking said seating member against accidental removal from said casing.

In testimony whereof I affix my signature in presence of two witnesses.

LUTHER T. PEARSALL.

Witnesses:
  HORACE R. REIGHART,
  ROY J. WILLIAMS.